United States Patent [19]

Niihara

[11] Patent Number: 5,105,271
[45] Date of Patent: Apr. 14, 1992

[54] MOTION PICTURE DATA CODING/DECODING SYSTEM HAVING MOTION VECTOR CODING UNIT AND DECODING UNIT

[75] Inventor: Takami Niihara, Yokosuka, Japan

[73] Assignee: Victor Company of Japan, Ltd., Yokohama, Japan

[21] Appl. No.: 589,002

[22] Filed: Sep. 27, 1990

[30] Foreign Application Priority Data

Sep. 29, 1989 [JP] Japan .................. 1-256111

[51] Int. Cl.⁵ .................. H04N 7/12; H04N 7/18
[52] U.S. Cl. .................. 358/133; 358/135; 358/105
[58] Field of Search ............... 358/105, 136, 133, 135, 358/141

[56] References Cited

U.S. PATENT DOCUMENTS

| | | | |
|---|---|---|---|
| 4,245,248 | 1/1981 | Netravali et al. | 358/136 |
| 4,668,987 | 5/1987 | Matsuda et al. | 358/136 |
| 4,769,826 | 9/1988 | Kubo et al. | 358/136 |
| 4,853,775 | 8/1989 | Rouvrais et al. | 358/105 |
| 4,862,264 | 8/1989 | Wells et al. | 358/136 |
| 4,924,310 | 5/1990 | von Brandt | 358/105 |
| 4,953,019 | 8/1990 | Skikakura et al. | 358/135 |

FOREIGN PATENT DOCUMENTS

57-199379 12/1982 Japan .
63-20075 4/1988 Japan .

*Primary Examiner*—Howard W. Britton
*Assistant Examiner*—Michael H. Lee
*Attorney, Agent, or Firm*—Fleit, Jacobson, Cohn, Price, Holman & Stern

[57] ABSTRACT

A motion picture data coding/decoding system comprises a motion vector coding unit for detecting a motion vector between input and reference images at every block of several pixels by correlative operation, and a motion vector decoding unit for decoding the motion vector. The coding unit comprises digitized block cutting circuits for respectively digitizing pixels of both the images in several stages, and cutting blocks having necessity of detecting the motion vector; a first motion vector detection circuit for performing the correlative operation of a motion vector dectection about the roughest stage blocks cut by the first stage cutting circuit; a second motion vector detection circuit for detecting a motion vector of the stage by a differential vector on the basis of the motion vector as an initial vector which is detected by the motion vector detection circuit rougher than the stage; a coding circuit for coding the motion vector between the input and reference images by the initial vector in the roughest stage block and differential vector of each stage. The decoding unit comprises a distributing circuit for distributing a code signal multiplied by the coding unit; a several stage decoding circuits for obtaining the differential vector of each stage by decoding several distributing codes; and the final stage decoding circuit for obtaining the initial vector by decoding the distributed code by the obtained differential vector.

8 Claims, 9 Drawing Sheets

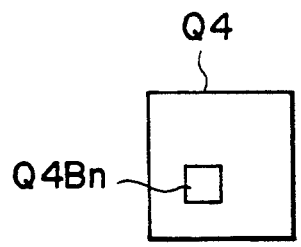 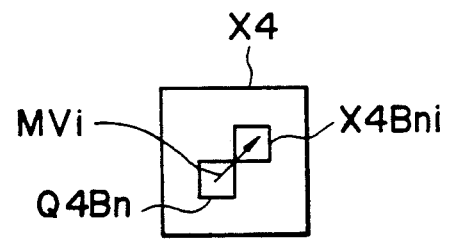
FIG. 3A          FIG. 3B
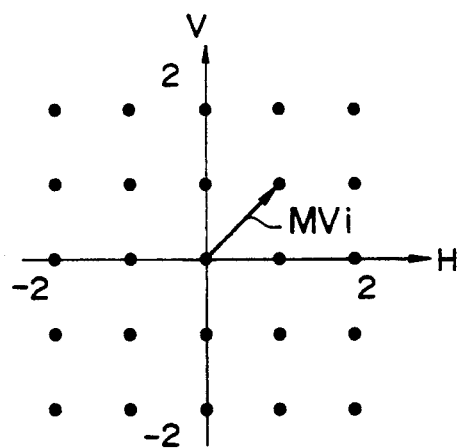
FIG. 4

| SHIFTED AMOUNT | | CODE |
|---|---|---|
| V | H | |
| 0 | 0 | 0 0 |
| 0 | -1 | 1 0 0 0 |
| 0 | 1 | 1 0 0 1 |
| -1 | 0 | 1 0 1 0 |
| 1 | 0 | 1 0 1 1 |
| -1 | -1 | 1 1 0 0 |
| -1 | 1 | 1 1 0 1 |
| 1 | -1 | 1 1 1 0 |
| 1 | 1 | 1 1 1 1 |

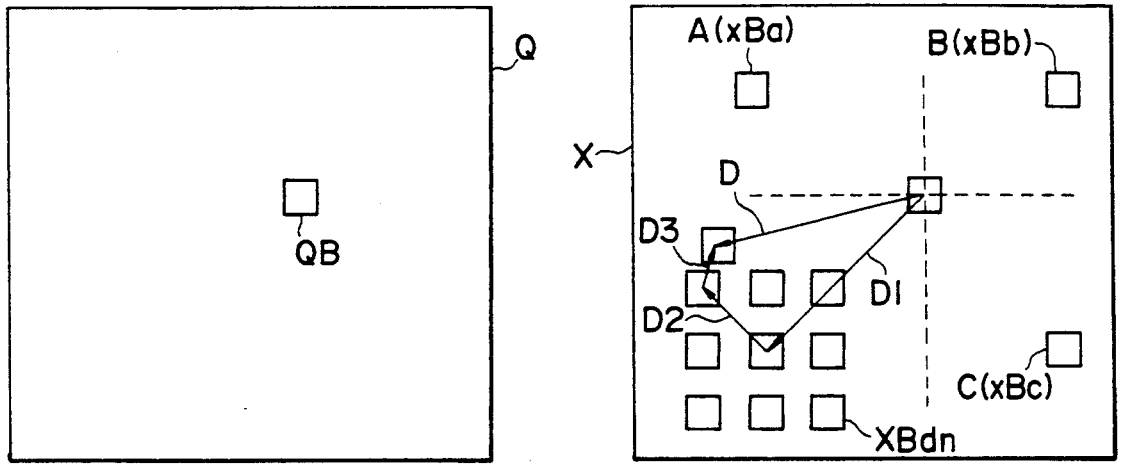
FIG. 12A PRIOR ART
FIG. 12B PRIOR ART
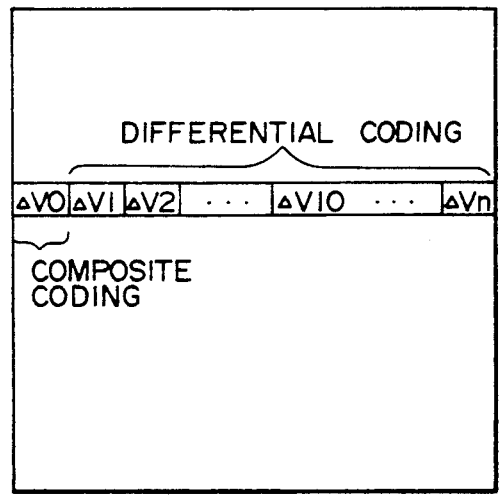
FIG. 13 PRIOR ART

MOTION PICTURE DATA CODING/DECODING SYSTEM HAVING MOTION VECTOR CODING UNIT AND DECODING UNIT

BACKGROUND OF THE INVENTION

The present invention relates to a motion picture coding/decoding system, and more particularly to a suitable system having a motion vector coding unit and a motion vector decoding unit used in motion vector coding and decoding which are used for picture compression and de-compression of a digital moving picture image.

In an interframe coding of the moving picture image such as a television picture, motion compensation is carried out in order to reduce a deterioration of coding efficiency for moving portions. The motion-compensated coding uses a motion vector representing a moving direction and velocity of the motion picture. For example, an official gazette of the Japanese Patent Publication No. 63-20075 (1988) has disclosed a so-called block matching method in which a process is utilized by detecting a motion vector by a two-dimesional block unit.

Here, there will be described the motion vector detection process in the block matching method with reference to FIGS. 10A, 10B and 11. In this method, as shown in FIGS. 10A and 10B, a correlation is detected between a present block QB of an input image Q of a present frame and a plurality of blocks XBi (i=1, 2, 3, ...) to which trial vectors VKi (i=1, 2, 3, ...) are displaced from positions corresponding to the present blocks in a previous frame designated as a reference (or comparison) image X. The many blocks XBi are set within a compensation range, which are shown by a plurality of dots in FIG. 11. As the result, a predetermined block including the same or corresponding image, has the largest correlation, and a trial vector thereof is detected as the motion vector.

However, the above method is not practical because an operation quantity for determining the motion vector becomes large. For improving the block matching method, an interframe coding method is disclosed in the Japanese Patent Publication No. 63-20075 (1988). As shown in FIGS. 12A and 12B, a motion vector is obtained by operation in multistage on the basis of an input image Q and a reference image X.

In both figures, a pixel block QB is cut out from the input image Q as an original picture image. On the other hand, four pixel blocks of the reference image X displacing at predetermined positions in four direction against the position of the block QB, namely blocks XBa, XBb, XBc and XBd each having centers A, B, C and D, are respectively cut out. A correlation between the block QB and four blocks XBa-XBd is obtained by using a pricing function, thereby obtaining a motion vector D1 of a first stage having the strongest correlation.

Next, predetermined pixel blocks XBd1-XBd9, which exist respectively at positions in nine directions with respect to the motion vector D1, are cut out, respectively. A correlation between the blocks XBd1-XBd9 and the block QB is obtained by the above function, thereby obtaining a motion vector D2 of a second stage having the strongest correlation.

Furthermore, predetermined nine-pixel blocks, which exist respectively at peripheral positions against the motion vector D2, are cut out, respectively. A correlation between these nine blocks and the block QB is obtained by the above function, thereby obtaining a motion vector D3 of a third stage having the strongest correlation in order to detect the final motion vector D.

The motion vectors detected by the methods of FIGS. 10A, 10B, 11, 12A and 12B are processed as shown in FIG. 13. A differential vector $\Delta V_n$ is obtained between both adjacent blocks in the horizontal direction (or the vertical direction) to the obtained motion vector, and the initial vector $V_0$ and the differential vectors $\Delta V_n$ are coded, so that the entire motion vector V is coded.

In the decoding operation, the initial vector $V_0$ is first decoded, the differential vectors $\Delta V_n$ are sequentially decoded in the manner that the differential vector $\Delta V_n$ is added to the former vector $V_{n-1}$ immediately prior, thereby performing the decoding.

On the other hand, Japanese Patent Application Laid-open No. 57-199379 (1982) discloses a vector coding system performing a vector coding by using a variable length code. The system operates to change the detected motion vector into a vector having a small absolute value. In the system, the variable length code is determined according to a magnitude of the absolute value. Namely, the short length code is added to the vector having the small absolute value, while the long length code is added to the vector having the large absolute value. Furthermore, a code is added to distinguish the directions of the vectors. Accordingly, the motion vector is decoded for data compression by using the variable length code of each vector, which is constructed by a short length code to a vector having a small absolute value.

However, the conventional motion vector coding/decoding system has the demerit that it is impossible to obtain the sufficient compression effect because of the use of only the horizontal motion vector.

Furthermore, when an error such as $\Delta V10$ occurs in the transmission path, the system has the problem that entire vectors such as $\Delta V10$ to $\Delta Vn$ after the vector $\Delta V10$ are wrong.

Still furthermore, when the motion compensation value is set in the large range, the system has the problems that the differential motion vector has to be a large value and the code book for a variable length coding becomes large.

SUMMARY OF THE INVENTION

An object of the present invention is to provide a motion picture data coding/decoding system having a motion vector coding unit and decoding unit capable of obtaining a sufficiently high compression effect for compressing a motion picture by means that pixels of an input image and a reference image are respectively decimated by a plurality of stages so that a motion vector is coded by the correlative calculation on the basis of the decimated blocks in the first stage.

Another object of the present invention is to provide a coding/decoding system capable of stably transmitting signals, even though an error occurs in the transmission path, successive errors after that being prevented from generating.

Still another object of the present invention is to provide a coding/decoding system having no necessity for enlarging the code book for the variable length coding without setting the large value of the differential motion vector, even if the range of the motion compensation is extended.

In order to achieve the above objects, the present invention is to provide a motion vector coding unit for detecting a motion vector between an input image and a reference image at every block of a predetermined number of pixels by a predetermined correlative calculation, wherein the unit comprises a decimated block cutting circuit for cutting out a necessary block in order to detect the moton vector by decimating pixels of the input and reference images at a plurality of stages, respectively, a first motion vector detection circuit for detecting a motion vector as an initial vector by a correlation calculation about the roughest stage block in several blocks cut out by the decimated block cutting circuit, a second motion vector detection circuit for a motion vector as a differential vector at the stage on the basis of a motion vector as the initial vector which is detected by the motion vector detection circuit at the rougher stage, and a coding circuit for coding the motion vector between the input image and the reference image on the basis of the initial vector of the roughest stage block and a differential vector at each stage.

The system of the inveniton includes a motion vector decoding circuit for the motion vector between the input image and the reference image on the basis of initial vector and the differential vector which are coded by the motion vector coding unit.

By the present invention, the input and reference images are respectively sampled so that the block is cut out. For example, after a ½ and ¼ of the pixels are respectively decimated, a necessary block for detecting the motion vector is cut out of a decimated image, and the motion vector is at the plurality of stages and coded by the initial vector and the differential vectors. As a result, the motion vector between the input and reference images is decoded on the basis of the coded initial vector and the coded differential vectors.

As above-mentioned in detail, the motion vector coding/decoding system of the invention has the following features.

(i) As the motion vector is coded by stages, the correlation in both the vertical and horizontal directions is used in the first stage coding.

(ii) Even though the motion compensation range is extended, the code book used in the first stage coding is applicable in the broader range and can correspond to the broader motion compensation range.

(iii) Furthermore, the system has the merit that an error of the transmission path does not have a material influence on the decoding. Namely, even though the first stage operation is wrong, the decoding is not influenced because the nearby motion vector of the first stage is used. When an error occurs in the stages after the first stage, the error does not influence the decoding because the error after first stage is a small predictive error value against the immediately former stage motion vector.

BRIEF DESCRIPTION OF THE DRAWINGS

In the accompanying drawings:

FIGS. 3A and 3B are schematic views for explaining a motion vector detection and a coding at a first stage;

FIG. 4 is a characteristic diagram showing an example of a shifted amount at the first stage;

FIGS. 12A and 12B are schematic views for explaining a motion vector detection and a coding according to the conventional unit; and FIG. 13 is a view for explaining the conventional motion vector coding.

DETAILED DESCRIPTION OF THE PREFERRED EMBODIMENT

There will be described in detail an embodiment of a motion picture data coding/decoding system according to the present invention with reference to the accompanying drawings.

In the embodiment, a ½ and ¼ of pixels are decimated in both the horizontal and vertical directions, respectively, and a motion vector is coded and decoded in three stages.

Construction of Coding Unit

Figure 1:
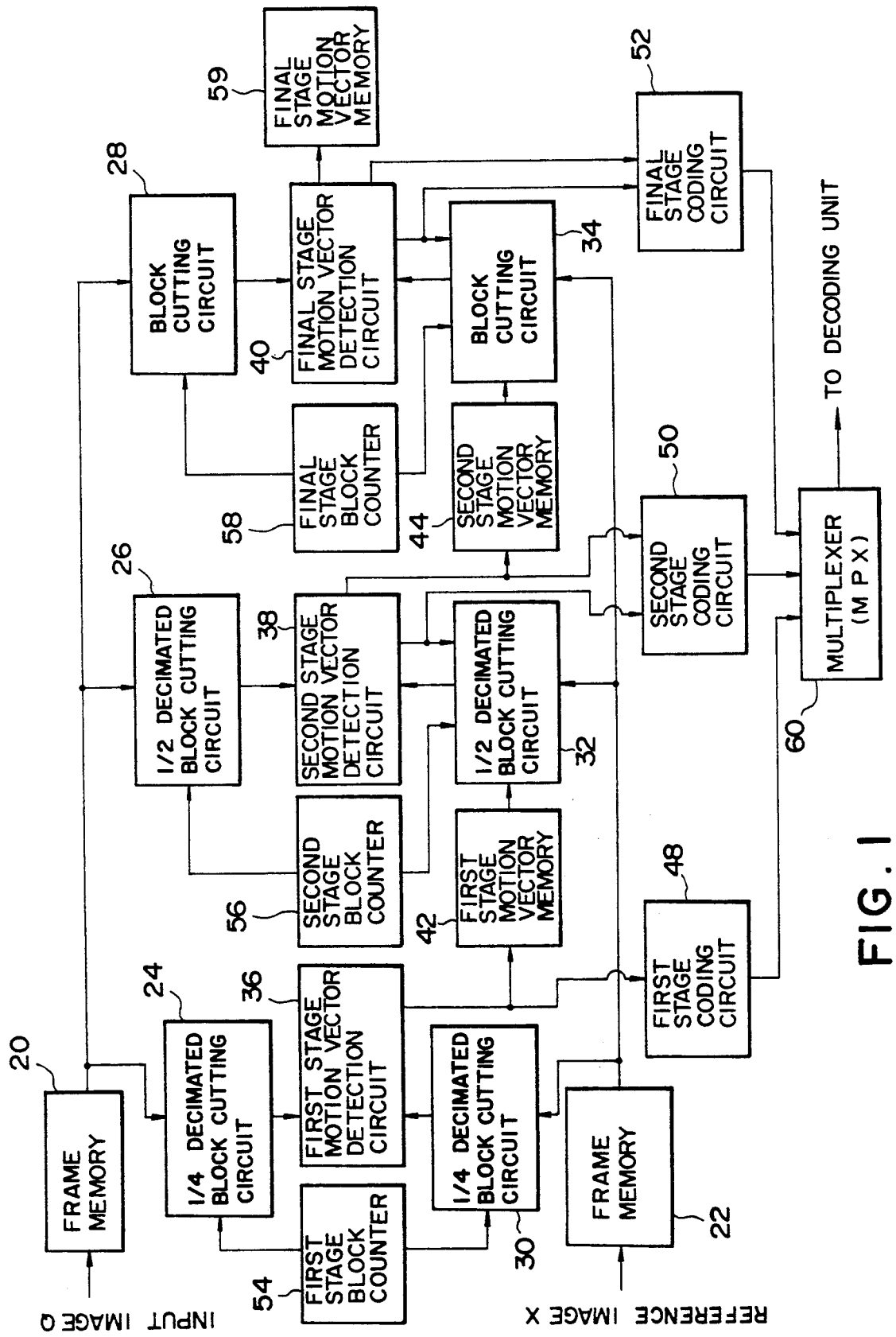
FIG. 1 is a block diagram showing construction of a motion vector coding unit according to a first embodiment of the present invention.

FIG. 1 shows a construction of a motion vector coding unit according to an embodiment of the present invention. In the figure, an input image Q is stored in a frame memory 20, and a reference image X such as an image in a frame immediately before a frame of the input image Q is stored in a frame memory 22. An output side of the memory 20 is connected to input sides of cutting circuits 24, 26 and 28, respectively. An output side of the memory 22 is connected to each input side of decimated block cutting circuits 30, 32 and 34 at every stage. The cutting circuits 24 and 30 are designated respective blocks by a first stage block counter 54, the cutting circuits 26 and 32 are designated respective blocks by a second stage block counter 56, and the cutting circuits 28 and 34 are designated respective blocks by a final stage block counter 58.

Output sides of the cutting circuits 24 and 30 are respectively connected to an input side of a first motion vector detection circuit 36, output sides of the cutting circuit 26 and 32 are respectively connected to an input side of a second motion vector detection circuit 38, and output sides of the cutting circuit 28 and 34 are respectively connected to a final stage motion vector detection circuit 40.

An output side of the first stage detection circuit 36 is connected through a first stage motion vector memory 42 to a ½ decimated block cutting circuit 32 and also connected to a first stage coding circuit 48. An output side of the second stage detection circuit 38 is connected through a second stage motion vector memory 44 to a decimated block cutting circuit 34 and also connected to a second stage coding circuit 50. An output side of the final stage detection circuit 40 is connected to a final stage motion vector memory 59, the decimated block cutting circuit 34 and a final stage coding circuit 52. Outputs from the first stage coding circuit 48, the second stage coding circuit 50 and the final stage coding circuit 52 are multiplexed by a multiplexer 60 so as to output a final motion vector.

Figure 2A:
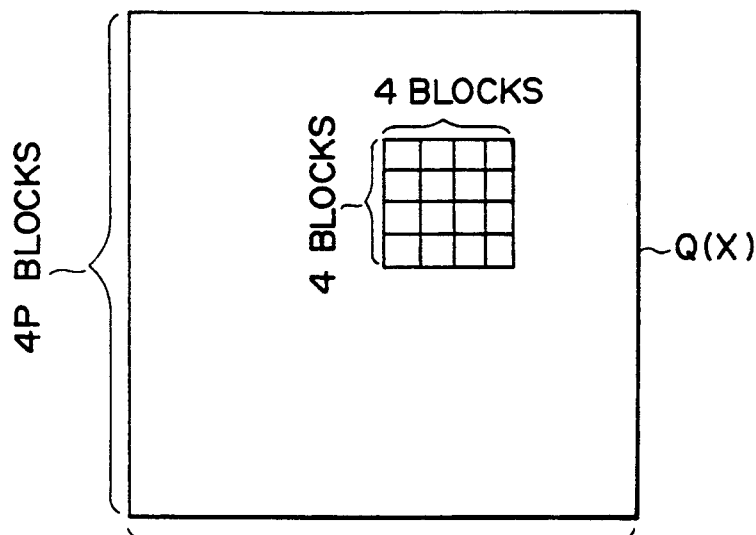
FIGS. 2A to 2C are schematic views for explaining a motion vector detection using a decimated block by the coding unit shown in FIG. 1.
Figure 2B:
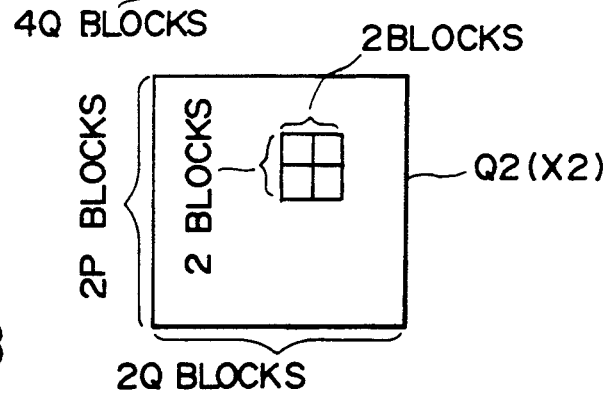
Figure 2C:
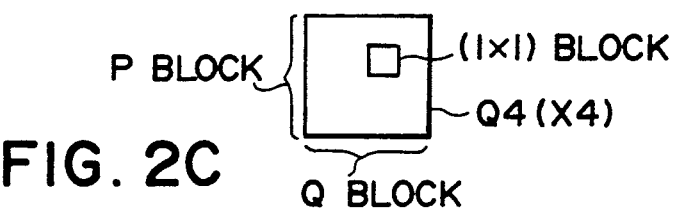

As shown in FIGS. 2A to 2C, the cutting circuits 24 and 30 respectively cut out a block (entire block numbers are P by Q) having a predetermined (for example, 8 by 8) pixels from ¼ decimated image mentioned later, and the cutting circuit 26 and 32 respectively cut out a predetermined pixel blocks (entire block numbers are 2P by 2Q) from a ½ decimated image mentioned later. Furthermore, the cutting circuits 28 and 34 respectively cut out predetermined pixel blocks (entire block numbers are 4P by 4Q) from images without decimation.

The first stage detection circuit 36 detects the first stage (the roughest stage) motion vector by a correlational calculation based on an input pixel block so as to output the roughest motion vector as an initial vector. The second stage detection circuit 38 detects the second stage motion vector by the correlational calculation based on the input pixel block so as to output a differential vector (a code and shifted amount) between the motion vector detected at the first stage (or the rougher stage than this stage) and the second stage motion vector. Furthermore, the final stage detection circuit 40 detects the final stage motion vector by correlational calculation based on the input pixel block so as to output a differential vector (a code and shifted amount) between the motion vector detected at the second stage (or the rougher stage than this stage) and the final stage motion vector.

In the above embodiment, as shown in FIGS. 2A to 2C, both pixels of the input image Q and the reference image X are decimated in both vertical and horizontal directions, and the motion vector detection of the block of the 8 by 8 pixels is carried out in three stage. Accordingly, 4 by 4 (=16) blocks (32 by 32 pixels) on the present input image Q (the present reference image X) correspond to 2 by 2 (=4) blocks (16 by 16 pixels) on the image Q2 (X2) which is decimated of ½, and correspond to 1 by 1 (=1) block (8 by 8 pixels) on the image Q4 (X4) which is decimated into ¼.

It should be noted that the number of pixels in the ¼ decimated image Q4 is one sixteenth of pixels in the original image Q and in the ½ decimated image Q2, and the number of pixels is one fourth of pixels in the original image Q.

First Stage Motion Vector Detection and Coding

At first, the input image Q is decimated into ¼, as shown in FIG. 3A, to generate a ¼ decimated image Q4. A block Q4Bn (where a character n denotes block number P by Q) of 8 by 8 pixels as a motion vector detected object is cut out of the decimated image Q4 by the cutting circuit 24.

On the other hand, as shown in FIG. 3B, the pixels of the reference image X are decimated so as to generate a ¼ decimated reference image X4. Each of 25 blocks (8 by 8 pixels) X4Bni corresponding to twenty five trial vectors Vi (i=1−25) drawn from the block Q4Bn is selected successively for the image X4 by the cutting circuit 30.

These trial vectors are illustrated in FIG. 4. In this figure, the origin represents the position of the Q4Bn, and 25 dots indicate the position of 25 adjacent blocks, so that a vector drawn form the origin to one of the dots represents a trial vector.

Both outputs of block Q4Bn and twenty five block X4Bni are supplied to the first detection circuit 36 where a correlation between both blocks is obtained by using a suitable performance function. A trial vector of the most correlative in the twenty five blocks X4Bni is detected as the first motion vector MVi and is outputted from the first detection circuit 36 to the first motion vector memory 42, and the first motion vector is further outputted to the first coding circuit 48.

There are similarly detected and coded entire first stage motion vectors (initial vectors) MVi corresponding every blocks Q4Bn (character n means P by Q as gross blocks).

Second Motion Vector Detection and Coding

The first motion vector MVi of "P×Q=n" blocks detected by the above operation is read out from the first stage motion vector memory 42 to the cutting circuit 32. The second stage motion vector is detected on the basis of a vector twice as much as the first motion vector MVi in both vertical and horizontal directions as an initial value (the second stage initial vector).

Figure 5A:
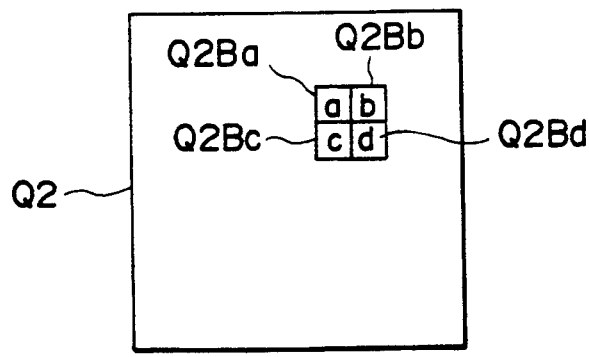
FIGS. 5A to 5D are schematic views for explaining a motion vector detection and a coding at a second stage.

In the second stage, the cutting circuit 26 decimates the pixels of the input image Q into ½ to generate the ½ decimated image Q2 shown in FIG. 5A. On the other hand, the cutting circuit 32 similarly decimates the pixels of the reference image X to generate the ½ decimated reference image X2 shown in FIG. 5C.

Figure 5B:
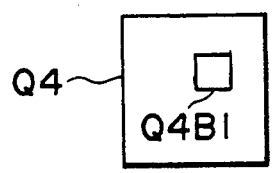

The above-mentioned block Q4B1 (namely, n=1) on the ¼ decimated input image Q4 corresponds to four blocks Q2Ba, Q2Bb, Q2Bc and Q2Bd having 8 by 8 pixels on the ½ decimated input image Q2, as shown in FIGS. 5A and 5B. Accordingly, the second stage motion vector detection is carried out at every these four blocks Q2Ba, Q2Bb, Q2Bc and Q2Bd.

Figure 5C:
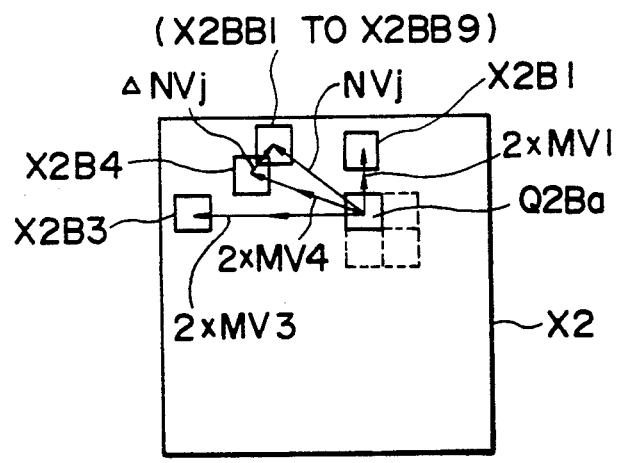
Figure 5D:
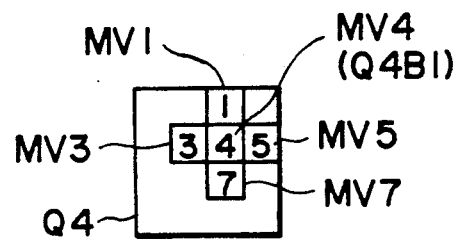

The blocks Q2Ba, Q2Bb, Q2Bc and Q2Bd having 8 by 8 pixels are respectively cut out from the image Q by cutting circuit 26 on the basis of an output of the second stage block counter 56. As shown in FIGS. 5C and 5D, three of the first stage motion vector corresponding to the output (anyone of four blocks Q2Ba, Q2Bb, Q2Bc and Q2Bd) of the counter 56 are read out from the first stage motion vector memory 42 by selecting them from five of the first stage motion vector MV4, MV1, MV3, MV5, and MV7 respectively corresponding to the blocks having different positions as follows:

(i) When the outputted second stage block is in the position a (left position diagonally over the center), as shown in FIG. 5A, namely Q2Ba is outputted, there are read out three vectors, that is, the motion vector MV1 of the position 1, MV3 of the position 3, and MV4 of the position 4 of the first stage from the first stage motion vector memory 42.

(ii) When the outputted second stage block is in the position b (right position diagonally over the center), as shown in FIG. 5D, namely, Q2Bb is outputted, there are read out three vectors, that is, the motion vector MV1 of the position 1, MV4 of the position 4, and MV5 of the position 5 of the first stage from the first stage motion vector memory 42.

(iii) When the outputted second stage block is in the position c (left position diagonally under the center), as shown in FIG. 5D, namely, Q2Bc is outputted, there are read out three vectors, that is, the motion vector MV3 of the position 3, MV4 of the position 4, and MV7 of the position 7 of the first stage from the first stage motion vector memory 42.

(iv) When the outputted second stage block is in the position d (right position diagonally under the center), as shown in FIG. 5A, namely, Q2Bd is outputted, there are read out three vectors, that is, the motion vector MV4 of the position 4, MV5 of the position 5, and MV7 of the position 7 of the first stage from the first stage motion vector memory 42.

As shown in FIG. 5C, three motion vectors are read out from the memory 42 and they are doubled in both the horizontal and vertical directions, then three blocks corresponding to these doubled vectors are selected from the ½ decimated reference image X2 by the cutting circuit 32. For example, in the case of the above paragraph (i), blocks X2B1, X2B4, and X2B3 are selected. Then, the correlative relation between the block Q2Ba and each of these three blocks is calculated and a mode information "00", "10" or "11" is supplied to the second coding circuit 50 in response to calculation as follows:

(i) When the relation using the first stage motion vector MV4 is most correlative, the mode information "00" is supplied to the second coding circuit 50.

(ii) When the relation using the first stage motion vector MV1 or MV7 is most correlative, the information "10" is supplied to the second coding circuit 50.

(iii) When the relation using the first stage motion vector MV3 or MV5 is most correlative, the information "11" is supplied to the second coding circuit 50.

Figures 6, 8:
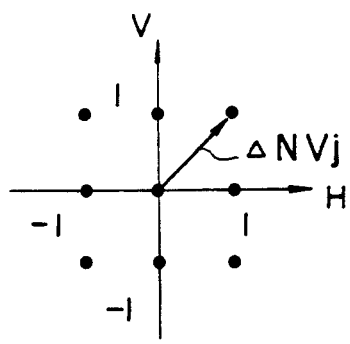
FIG. 6 is a characteristic diagram showing an example of a shifted amount at stages after the first stage.
FIG. 8 is a view showing a code of the shifted value of a differential vector.

Next, nine blocks X2BB1 to X2BB9 arround the block corresponding to the most correlative vector selected in previous stage described hereinbefore are selected from the ½ decimated reference image X2. These blocks correspond to nine differential vectors ΔNVj as illustrated in FIG. 6. In this figure, the origin corresponds to the position of the block indicated by the selected vector as the most correlative one in the previous stage. These nine blocks X2BB1 to X2BB9 selected above are supplied to the second detection circuit 38. The correlation between these blocks and the block Q2Ba is calculated by the proper performance function so as to determine the second stage motion vector NVj by the most correlative one. The detected second stage motion vector NVj is supplied to the second stage motion vector memory 44, and only the shifted amount (differential vector ΔNVj) is supplied to the second coding circuit 50.

As the same manner as the above operation, the second stage motion vector NVj of gross number of 2P by 2Q is detected and outputted at each position a, b, c and d. The second stage coding circuit 50 codes the shifted amount (differential vector ΔNVj) and the mode information as the second stage motion vector.

Final Motion Vector Detection and Coding

The final (third stage) motion vector is detected in the same manner as the second stage motion vector detection so as to be supplied to the final stage motion vector memory 46. At the same time, the mode information and shifted amount are supplied to the final stage coding circuit 52.

As described above, the second motion vector NVj of 2P by 2Q detected in the second stage is suitably read out of the second stage motion vector memory 44. The vector NVj read out of the memory 44 is doubled and then used in the final stage motion vector detection as an initial vector.

Figure 7A:
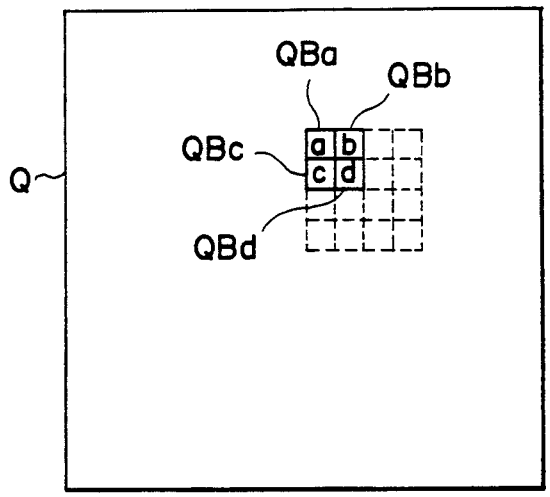
FIGS. 7A to 7D are schematic views for explaining a motion vector detection and a coding at a third stage.

In the final stage, the image is not decimated and the input image Q and reference image X are used as they are. The cutting circuit 28 cuts out to generate sixteen blocks from the input image Q, as shown in FIG. 7A. On the other hand, the cutting circuit 34 cut out to generate blocks shwon in FIG. 7C from the reference image X.

Figure 7B:
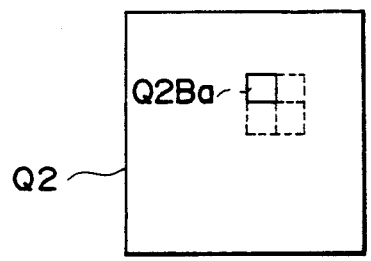

The block Q2Ba on the ½ decimated input image Q2, as shown in FIGS. 7A and 7B, corresponds to four blocks QBa, QBb, QBc and QBd having 8 by 8 pixels on the input image Q. Accordingly, the final stage motion vector detection is carried out at every block QBa, QBb, QBc and QBd.

Figure 7C:
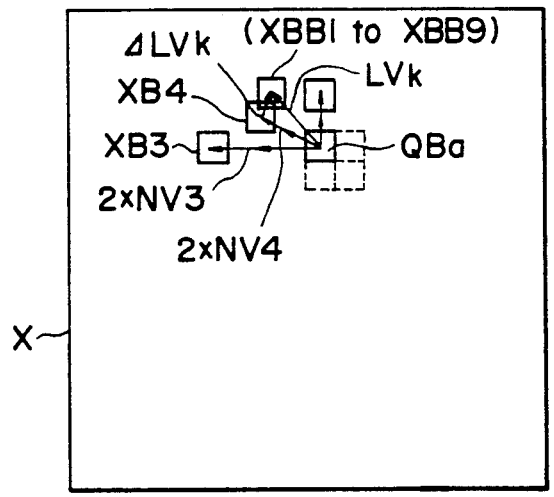
Figure 7D:
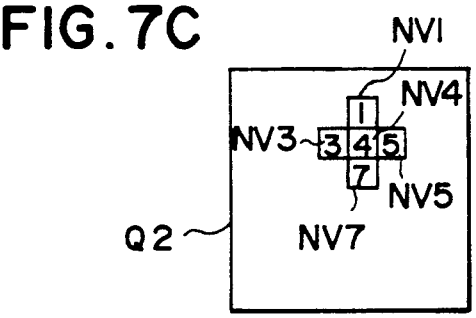

The blocks QBa, QBb, QBc and QBd having 8 by 8 pixels are outputted from the cutting circuits 28 controlled by an output of the final block counter 58. As shown in FIGS. 7C and 7D, three of the second stage motion vector NVj are read from the vector memory 44 by selecting from the five motion vectors NV0, NV1, NV3, NV5 and NV7 of the second stage respectively at positions 4 of the second stage of Q2Ba at center, 1 over the center position, 3 at left of the center position, 5 at right of the center position, and 7 under the center position. The five positions of the second stage are determined by an output of the block counter 58 corresponding to four outputs of blocks QBa, QBb, QBc and QBd in the manner as follows.

(i) When the final stage block is outputted as the position a of FIG. 7A at left diagonally over the center position (QBa), the motion vectors NV1, NV3, and NV4 are read out of the second stage memory 44, which respectively correspond to the second stage vectors at positions 1, 3 and 4, as shown in FIG. 7D.

(ii) When the final stage block is output as the position b of FIG. 7A at right diagonally over the center position (QBb), the motion vectors NV1, NV4 and NV5 are read out of the second stage memory 44, which respectively correspond to the second stage vectors at positions 1, 4 and 5, as shown in FIG. 7D.

(iii) When the final stage block is output as the position c of FIG. 7A at left diagonally under the center position (QBc), the motion vectors NV3, NV4 and NV7 are read out of the second stage memory 44, which respectively correspond to the second stage vectors at positions 3, 4 and 7, as shown in FIG. 7D,.

(iv) When the final stage block is output as the position d of FIG. 7A at right diagonally under the center position (QBd), the motion vectors NV4, NV5 and NV7 are read out of the second stage memory 44, which respectively correspond to the second stage vectors at positions 4, 5 and 7, as shown in FIG. 7D.

Three motion vectors of the second stage are multiplied twice in both the horizontal and vertical directions to obtain double vectors. Blocks corresponding to the doubled vectors, for example, blocks XB1, XB4 and XB3 are cut out of the reference image X to obtain the most correlative vector between the cut-out block and the block QBa. Mode informations "00", "10" and "11" are supplied to the final stage coding circuit 52 corresponding to the most correlative motion vector of the second stage.

(i) When the most correlative vector is the second stage motion vector NV4, the mode information "00" is supplied to the coding memory 52.

(ii) When the most correlative vector is the second stage motion vector NV1 or NV7, the mode information "10" is supplied to the coding circuit 52.

(iii) When the most correlative vector is the second stage motion vector NV3 or NV5, the mode information "11" is supplied to the coding circuit 52.

The nine blocks XBB1 to XBB9 are obtained by nine shifted mounts (differential vector LVk) on the basis of vector "2×NV4" which is the most correlative to five of the second stage vectors NV4, NV1, NV3, NV5 and NV7. The blocks XBB1 to XBB9 are cut out of the reference image X by the cutting circuit 34 to supply the final detection circuit 40. The correlation between the blocks XBB1 to XBB9 and the block QBa is estimated by using the proper performance factor. A trial vector corresponding to the most correlative block is set to the final stage motion vector LVk. The detected final motion vector LVk is supplied to the motion vector memory 46 and only the shifted amount (the differential vector ΔLVk) is supplied to the final stage coding circuit 52.

In the same manner as above, the final stage motion vector LVk is detected and outputted, which is the gross blocks of "4P×4Q" obtained by sixteen of every four operations at the positions a, b, c and d. The shifted amount (differential vector ΔLVk) and mode information are supplied to the final stage coding circuit 52.

Entire Coding of Motion Vector

The first stage motion vector coding is carried out in the manner that the first stage vector coding circuit 48 codes the initial vector from the detection circuit 36 by using the variable length code to supply it to the MPX 60.

The second stage motion vector is coded as follows:

(i) When the mode information is "00", the second vector coding circuit 50 outputs the code as shown in FIG. 8 corresponding to the shifted amount (differential vector) to the MPX 60.

(ii) When the mode information is "10", the coding circuit 50 outputs the code as shown in FIG. 8 corresponding to the shifted amount (differential vector) to the MPX 60 after outputting the escape code "010".

(iii) When the mode information is "11", the coding circuit 50 outputs the code as shown in FIG. 8 corresponding to the shifted amount (differential vector) to the MPX 60 after outputting the escape code "011".

The final stage motion vector coding is carried out in the same manner (i) to (iii) of the second stage.

All outputs from coding circuits 48, 50 and 52 are multiplexed by the multiplexer (MPX) 60 and the final signal is outputted from the MPX 60 to the coding unit.

Construction of Decoding Unit

Figure 9:
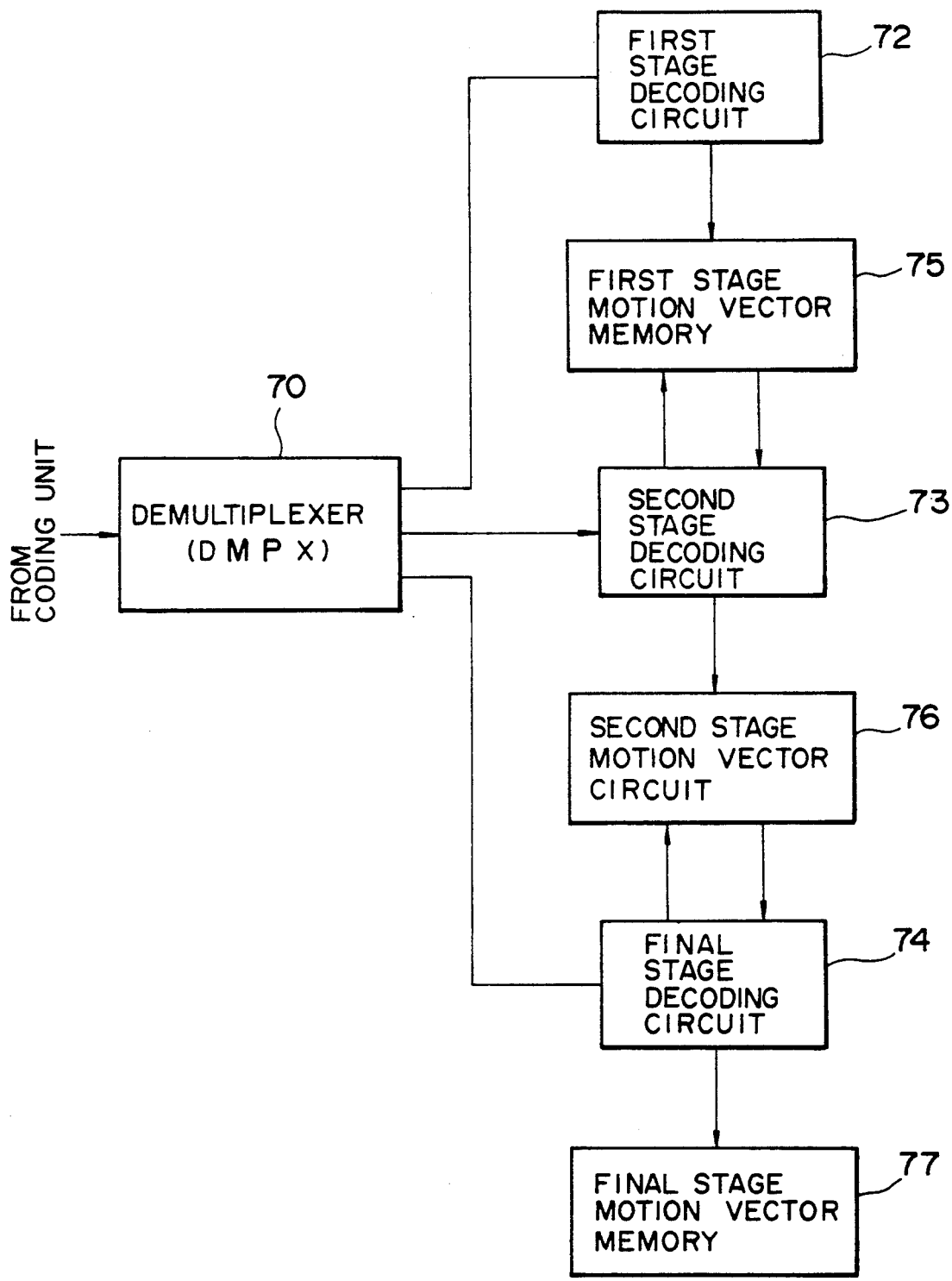
FIG. 9 is a block diagram showing a construction of a motion vector decoding unit according to an embodiment of the present invention.
Figure 10A:
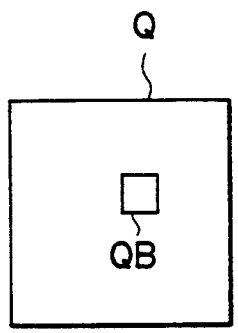
FIGS. 10A and 10B are schematic views showing a motion vector detection of a conventional motion vector coding unit.
Figure 10B:
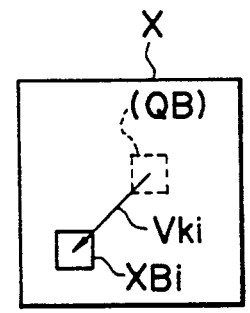
Figure 11:
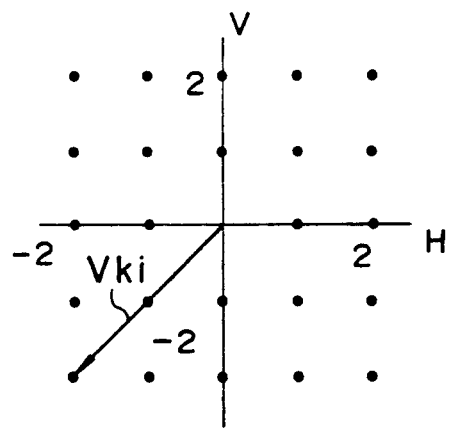
FIG. 11 is a characteristic diagram showing a shifted amount according to the conventional decoding unit.

The motion vector decoding unit will be described with reference to FIG. 9 (also refer to FIGS. 3A to 7A).

The motion vector coded in the coding unit as mentioned above, is supplied to a demultiplexer (DMPX) 70. The DMPX 70 separates the motion vector again into three signals so as to supply to a first stage decoding circuit 72, second stage decoding circuit 73 and third stage decoding circuit 74. A first stage motion vector memory 75 stores an initial vector decoded in the first stage decoding circuit 72, and a second and third stage motion vector memories 76 and 77 each store the motion vectors of each stage, each of which is decoded in the second and third stage decoding circuit 73 or 74.

Decoding by Decoding Unit

The first stage decoding circuit 72 decodes the first stage motion vector (the initial vector) so as to output to the first stage motion vector memory 75.

The second stage decoding is carried out as follows:

(i) When the second stage decoding circuit 73 receives the code without "010" or "011", the reception is decoded by the variable length, the first block motion vector corrsponding to the second block is read out of the first stage motion vector memory 75. Both horizontal and vertical components of the motion vector are multiplied by two in the multiplier circuit 73C to generate a double vector. The double vector is added with the differential vector (the shifted amount) which is decoded in the previous time.

(ii) When the code received by the decoding circuit 73 is the code of "010" or "011", the successive input code of the reception code is decoded in the variable length to generate the vector. The decoded vector is added with the doubled vector in which the motion vector of the second stage block and the first stage block corresponding to the code of "010" and "011" is multiplied twice in the multiplier circuit 74C in both the horizontal and vertical directions.

The second stage motion vector which is obtained by the above operation, is supplied to the second stage motion vector memory 76.

The final stage motion vector is decoded in the same manner as the second stage motion vector so as to supply it into the final stage motion vector memory 77.

Modificated and Applied Example

Through the above embodiment detects the final motion vector as three stages, a much larger number than three stages may be used in order to detect the motion vector.

Though the above emdodiment decimates blocks in both input and reference images, any of them may be generated images by the proper sampling without decimating the blocks.

Furthermore, the above embodiment uses the blocks of "8 by 8" pixels, but blocks may be constructed by "L by M" pixels in general.

Still furthermore, when the motion compensation interframe coding is performed by using the final stage motion vector, the final stage motion vector of the refreshed blocks may not be coded. In this case, the information as to whether or not the blocks may be refreshed, are also transmitted with the code information. If the blocks are refreshed, the decoding is carried out by jumping one block in the final stage decoding.

What is claimed is:

1. A moving picture data coding/decoding system having a motion image coding unit for coding a motion vector by a predetermined correlative operation between an input image and a reference image, and a motion vector decoding unit for decoding a motion image from a coded signal output from the coding unit, said coding unit comprising:

a first stage comprising:
 first stage block digitizing and cutting circuits for respectively digitizing pixels of the input and reference images and cutting blocks of pixels of the input and reference images;
 a first stage motion vector detection circuit for performing a correlative operation based on blocks cut by the first stage block digitizing and cutting circuits to output a first stage motion vector; and a first stage coding circuit for coding the output of the first stage motion vector detection circuit;

a second stage comprising:

second stage block digitizing and cutting circuits for respectively digitizing pixels of the input and reference images and cutting blocks of pixels of the input and reference images;

a second stage motion vector detector circuit for detecting a second stage motion vector according to a correlation calculation to output a second stage differential vector on the basis of the first stage motion vector and the second stage motion vector; and a second stage coding circuit for coding the output of the second stage motion vector detection circuit;

a final stage comprising:

final stage block digitizing and cutting circuits for respectively digitizing pixels of the input and reference images and cutting blocks of pixels of the input and reference images;

a final stage motion vector detection circuit for detecting a final stage motion vector according to a correlation calculation based on the second stage motion vector and the final stage motion vector to output a final stage differential vector; and a final stage coding circuit for coding the output of the final stage motion vector detection circuit.

2. The coding/decoding system of claim 1, wherein the coding unit further comprises a first frame memory for storing the input image data and a second frame memory for storing the reference image data;

the first stage block digitizing and cutting circuits comprising:

a first ¼ digitized block cutting circuit for receiving the stored data of the first frame memory;

a second ¼ digitized block cutting circuit for receiving the stored data of the second frame memory;

the second stage block digitizing and cutting circuits comprising:

a first ½ digitized block cutting circuit for receiving the data in the first frame memory;

a second ½ digitized block cutting circuit for receiving the data in the second frame memory;

the second stage block digitizing and cutting circuits comprising:

a first full block cutting circuit for receiving the data in the first frame memory;

a second full block cutting circuit for receiving the data in the second frame memory.

3. The coding/decoding system of claim 2, wherein the first stage further comprises:

a first stage block counter for controlling the first and second ¼ digitized cutting circuits, said first and second ¼ digitized block cutting circuits being connected to the first stage motion vector detection circuit;

a first stage motion vector memory for storing the first stage motion vector detected by the first stage motion vector detection circuit and for supplying the first stage motion vector to the second ½ digitized block cutting circuit;

the second stage further comprises:

a second stage block counter for controlling the first and second ½ digitized block cutting circuits, said first and second ½ digitized block cutting circuits being connected to the second stage motion vector detection circuit;

a second stage motion vector memory for storing the output of the second stage motion vector detection circuit and supplying said output to the second full block cutting circuit;

the final stage further comprises:

a final stage block counter for controlling the first and second full block cutting circuits, said first and second full block cutting circuits being connected to the final stage motion vector detection circuit;

a final stage motion vector memory for storing the output of the final stage motion vector detection circuit.

4. The coding/decoding system of claim 3, wherein the coding unit further comprises a multiplexer for multi-composing the outputs of the first, second and final stage motion vector detection circuits and for outputting a composite output to the decoding unit.

5. The coding/decoding system of claim 1, wherein the motion vector decoding unit comprises:

a first stage comprising:

a first stage decoding circuit for decoding the first stage motion vector;

a first stage motion vector decoding memory for storing the decoded first stage motion vector;

a second stage comprising:

a second stage decoding circuit for decoding the second stage motion vector;

a second stage motion vector decoding memory;

a final stage comprising:

a final stage decoding circuit for decoding the final stage motion vector;

a final stage motion vector decoding memory for storing the final stage motion vector.

6. The coding/decoding system of claim 5, wherein the motion vector decoding unit further comprises a demultiplexer for receiving the output of the multiplexer of the motion vector coding unit and supplying input to each of the first, second and final stage decoding circuits.

7. The coding/decoding system of claim 6, wherein the second stage decoding circuit comprises:

second stage decoding means for decoding an input according to a variable length code in response to a predetermined code in the input for generating a decoded differential motion vector;

multiplying means for multiplying horizontal and vertical components of the first stage motion vector stored in said first stage motion vector decoding memory by two; and means for adding the multiplied first stage motion vector to the decoded differential motion vector to generate the second stage motion vector.

8. The coding/decoding system of claim 7, wherein the final stage decoding circuit comprises:

final stage decoding means for decoding an input according to a variable length code in response to a predetermined code in the input for generating a decoded differential motion vector;

multiplying means for multiplying horizontal and vertical components of the second stage motion vector stored in said first stage motion vector decoding memory by two; and means for adding the multiplied second stage motion vector to the decoded differential motion vector to generate the final stage motion vector.

* * * * *